United States Patent Office 3,493,567
Patented Feb. 3, 1970

---

3,493,567
SUBSTITUTED DIAZOCINOPHENOTHIAZINES
Marshall D. Draper, Woodland Hills, Murle W. Klohs, Tarzana, and Francis J. Petracek, Agoura, Calif., assignors to Dart Industries Inc., Los Angeles, Calif., a corporation of Delaware
No Drawing. Filed Jan. 22, 1968, Ser. No. 699,367
Int. Cl. C07d 93/14; A61k 27/00
U.S. Cl. 260—243        1 Claim

ABSTRACT OF THE DISCLOSURE 5-lower alkyl-4H-5,6,7,8-tetrahydro-5,9-diazocino[1,2,3-kl]phenothiazines which are pharmaceutically useful as antidepressants.

---

This invention relates to compositions of matter classified in the art of chemitsry as substituted diazocinophenothiazines.

The invention sought to be patented is described as residing in the concept of the chemical compound 5-methyl - 4H - 5,6,7,8-tetrahydro-5,9 -diazocino[1,2,3-kl]phenothiazine.

As used throughout the application the term "lower alkyl" embraces both straight and branched chain alkyl radicals containing from 1 to 6 carbon atoms, for example, but without limitation, methyl, ethyl, n-propyl, isopropyl, n-butyl, tert-butyl, n-amyl, sec-amyl, n-hexyl, 2-ethylbutyl, 2,3-dimethyl-butyl and the like.

The tangible embodiment of this invention possesses the inherent general physical characteristics of being, in the form of its acid-addition salts, solid crystalline materials. Spectral analysis, elemental analysis, and the aforementioned physical characteristics taken together with the nature of the starting materials and mode of synthesis, positively confirm the structure of the compound sought to be patented.

The tangible embodiments of this invention possesses the inherent applied use characteristics of having antidepressant activity without adverse toxicity as determined by recognized and accepted pharmacological test procedures hereinafter to be described. Specifically the tests establish that the compound possesses antidepressant activity of the type possessed by the known antidepressant 10-(3-dimethylaminopropyl)phenothiazine (promazine).

The manner and process of making and using the invention will now be generally described so as to enable one skilled in the art to make and use the same as follows:

Reaction sequence:

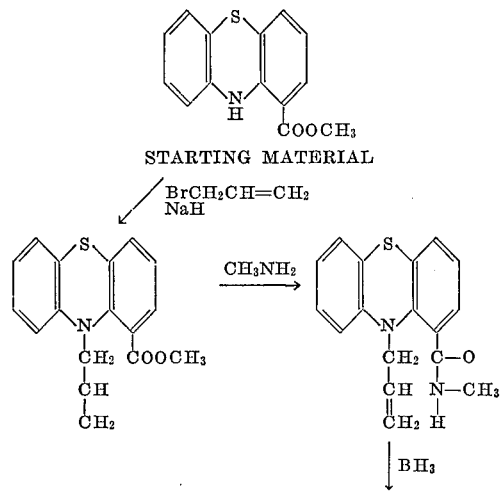

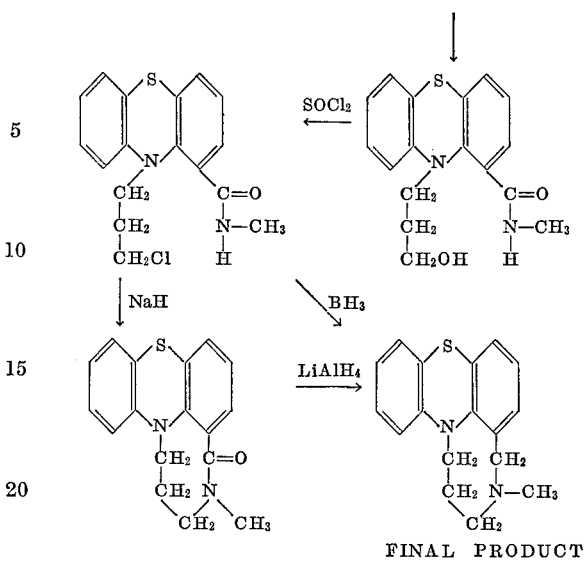

FINAL PRODUCT

The starting material according to the above depicted reaction sequence is the methyl ester of phenothiazine-1-carboxylic acid which is a known compound (Cauquill et al., Bull. Soc. Chim. 1049 (1960)) that is readily prepared by esterification of phenothiazine-1-carboxylic acid with dimethylsulfoxide. While, in the specific reaction sequence depicted above, the methyl ester is shown as the starting material, other lower alkyl esters are equally suitable as starting materials.

In the reaction sequence depicted above, the phenothiazine-1-carboxylic acid methyl ester is treated with allyl bromide in the presence of an inert organic solvent such as, for example, dimethyl formamide at room temperature to form a 10-allyl-phenothiazine-1-carboxylic acid methyl ester intermediate. This intermediate is treated with methylamine in the presence of an inert solvent, such as isopropanol, under substantially anhydrous conditions at up to the reflux temperature of the solvent used to yield the 10-allylphenothiazine-1-(N-methylcarboxamide) intermediate. The reaction is carried out in a bomb at up to 100° C.

The 10-allylphenothiazine-1-(N-methylcarboxamide intermediate is then treated with diborane in the presence of an inert organic solvent such as, for example, tetrahydrofuran, at from 0° C. to room temperature, followed by decomposition of the excess diborane and treatment with hydrogen peroxide to yield the 10-(3-hydroxypropyl)-phenothiazine-1-(N-methylcarboxamide intermediate. The corresponding 10-(3-chloropropyl)phenothiazine-1-(N-methylcarboxamide) intermediate is then obtained by treatment with thionyl chloride. This intermediate is then converted directly to the 5-methyl-4H-5,6,7,8-tetrahydro-5,9-diazocino-[1,2,3-kl]phenothiazine final product by treatment with additional diborane to simultaneously effect reduction and ring closure. Alternatively, the intermediate may be treated with sodium hydride at from room temperature to about 70° C. in the presence of an inert organic solvent such as dimethylformamide to form the 5-methyl-4-oxo-5,6,7,8-tetrahydro-5,9-diazocino - [1,2,3-kl]phenothiazine which is in turn reduced with lithium aluminum hydride to yield the final product.

Starting materials wherein the phenothiazine-1-carboxylic acid methyl ester bear one or more lower alkyl, or lower alkoxy or trifluoromethyl groups are prepared by the same method as their unsubstituted counterpart and are the full equivalents of the specific starting material depicted above, their use resulting in similarly substituted final products. Such final products have the same utility as the specific final products depicted hereinabove and are included within the scope of this invention.

In carrying out the above-described reaction sequence to prepare the tangible embodiment of this invention or its above described equivalents, lower-alkylamines other than methylamine can be used in the second step, thereby to prepare intermediates and final products having corresponding N-lower alkyl substitution, such final products being the full equivalents of and having the same utility as the specific final product depicted in the reaction sequence and being included within the scope of the present invention.

The tangible embodiment of this invention can, if desired, be converted into its non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate and the like. They may also comprise salts with organic acids, including monobasic acids such as the acetate or the propionate, and especially those with hydroxy organic acids and dibasic acids, such as citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexylbromide and the like. Such pharmaceutically useful acid-addition and quarternary ammonium salts are the full equivalents of the base from which they are derived and are included within the scope of this invention.

The tangible embodiment of this invention, either as a free base or in the form of a non-toxic pharmaceutically acceptable acid-addition or quaternary ammonium salt, can be combined with conventional pharmaceutical diluents and carriers to form such dosage forms as tablets, suspensions, solutions, suppositories and the like.

The individual unit dosage and frequency of administration is determined not only by the nature and severity of the depression for which the subject seeks relief, but in addition upon age, weight, and species of subject, its underlying physical condition and the route of administration. It will, accordingly, be within the judgement and skill of the practitioner administering the drug to determine the exact amount to be administered so as to be non-toxic, yet pharmaceutically effective in alleviating the symptoms of depression.

The best mode contemplated by the inventors for carrying out the invention will now be set forth as follows:

EXAMPLE 1

(a) 10-allyl-phenothiazine-1-carboxylic acid methyl ester

To 90 ml. of dry dimethylformamide in a 1 liter flask was added 0.81 mole of oil free (benzene washed) sodium hydride and 90 ml. (1.04 mole) of allyl bromide. To this cooled (ice-bath) mixture was added during 30 min. 45 g. (0.178 mole) of 1-carbomethoxyphenothiazine dissolved in 400 ml. of dry dimethylformamide. After stirring for an additional 45 minutes at room temperature the mixture was filtered to remove excess sodium hydride and sodium bromide and the filter cake was washed with fresh dimethyl formamide. The solution was evaporated (50° at 1 mm.) to an oil which was partitioned between ether (3 × 200 ml.) and water, to remove traces of dimethylformamide, The ether extract was washed once with dilute ammonium hydroxide, once with water, dried and evaporated in vacuo to 53.8 g. (98%) of a dark yellow oil. This oil was used without further purification. For characterization a sample was crystallized twice from methanol, M.P. 65–66° C;

*Analysis.*—Calculated for $C_{17}H_{15}O_2NS$: C, 68.66; H, 5.08; O,10.76; N, 4.71; S, 10.78. Found: C, 68.50; H, 5.09; O, 10.67; N, 4.70; S, 10.63.

(b) 10-allylphenothiazine-1-(N-methylcarboxamide)

A mixture of 4 g. (0.75 millimole) of the allyl ester, 45 ml. of methylamine and 15 ml. of isopropanol were sealed in a glass tube and heated at 100° C. overnight. Chromatography of the oily product yielded 3.4 g. of a mixture of acid and the desired amide. The acid was removed by extraction into dilute ammonium hydroxide leaving the amide in the ether layer. The amide was crystallized from benzene-pet. ether, 2.2 g. (55%); M.P. 101–103° C. Recrystallized for analysis, the sample melted at 102–104° C.

*Analysis.*—Calculated for $C_{17}H_{16}ON_2S$: C, 68.89; H, 5.44; O, 5.40; N, 9.45; S, 10.82. Found: C, 69.33; H. 5.06; O, 5.44; N, 9.41; S, 11.03.

(c) 10-(3-hydroxypropyl)phenothiazine-1-(N-methylcarboxamide)

To a stirred solution of 1.6 g. (5.4 mmoles) of the 10-allyl carboxamide in 25 ml. THF maintained at 0° was added 8 ml. (8 mmoles) of diborane in tetrahydrofuran. The resulting yellow solution was stirred at 0° C. for one hour. Whereupon the excess diborane was decomposed by the slow addition of water. The solution was warmed to about 50° and 1.8 ml. of 3 N sodium hydroxide was added followed by 1.1 ml. (11 moles) of 30% hydrogen peroxide. The mixture was again stirred for one hour at room temperature whereupon the tetrahydrofuran layer was separated by addition of solid potassium carbonate. Following evaporation in vacuo, the tetrahydrofuran oily product was dissolved in chloroform, washed with water, dried and evaporated in vacuo to an orange colored oil. Chromatography on neutral alumina with chloroform as the eluant gave a fraction totalling 1.4 g. of the desired alcohol. Although this alcohol has not been obtained crystalline spectral analysis confirm the structure as shown in the reaction sequence.

(d) 10-(3-chloropropyl)phenothiazine-1-(N-methylcarboxamide)

To a solution of 0.9 g. (2.9 mmoles) of the alcohol from "C" in 50 ml. dichloromethane cooled by an ice-bath was added 0.9 ml. (12 mmoles) thionyl chloride dropwise with stirring. The solution was then allowed to stir at room temperature for 24 hours when thin layer chromatographic analysis revealed a single new spot. The reaction solution was washed three times with water and the solvent dried and evaporated in vacuo to 1.0 g. of a light green glass. Crystallization from benzene-petroleum ether gave 0.8 g. (84%) of the chlorinated product; M.P. 169–173° C. An analytical sample was obtained by crystallization from benzene, M.P. 173–175.5° C.

*Analysis.*—Calculated for $C_{17}H_{17}ON_2SCl$: C, 61.34; H, 5.15; N, 8.42; Cl, 10.65. Found: C, 61.57; H, 5.24; N, 7.91; Cl, 10.52.

(e) 5-methyl-4-oxo-5,6,7,8-tetrahydro-5,9-diazocino [1,2,3-kl]phenothiazine

The chloropropyl amide (8 mg.) were dissolved in about 0.5 ml. of dry dimethylformamide and treated with excess sodium hydride (benzene washed). After one hour at room temperature the mixture was heated to 70° for 15 minutes. Thin layer chromatographic analysis showed a spot with Rf values similar to starting material but without the bright blue fluorescence. The reaction was worked up to gain a neutral fraction which in the IR showed the absence of —NH at 3.0 and 6.5μ indicating ring closure. After decolorization with Norite the oil was crystallized from benzene-petroleum ether yielding several mg. of the cyclic amide M.P. 180–182° C. The IR confirmed the structure as having cyclized. A 10 mg. run in xylene instead of dimethyl formamide showed the prominence of a side-reaction, presumably polymerization, dimethyl formamide at room temperature is very slow, the preferred conditions being dimethyl formamide at 70° for several hours. From a 150 mg. run 31 mg. of cyclized product were obtained, M.P. 179–181° C.

*Analysis.*—Calculated for $C_{17}H_{16}ON_2S$: C, 68.89; H, 5.44; N, 9.45. Found: C, 68.80; H, 4.76; N, 9.55.

(f) 5-methyl-4H-5,6,7,8-tetrahydro-5,9-diazocino [1,2,3-k1]phenothiazine

To excess lithium aluminum hydride in 10 ml. of ether was added with stirring 10 mg. of the cyclic amide in 10 ml. of tetrahydrofuran. After refluxing for 17 hours the reaction product was extracted to remove some neutral material and the base was precipitated as a crude hydrochloride salt which in turn was reconverted to the oily free base. Two mg. of a crystalline oxalate was prepared from the free base, M.P. 199–201° C. Starting with 0.49 g. (1.5 mmole) of crystalline chloroamide, the cyclization and final reduction were run without isolation of the cyclic amide. The final product was isolated by chromatography of the free base on neutral alumina. The yield of a free base was 170 mg. (40%). A 120 mg. sample was converted to the oxalate, 105 mg. M.P. 203–203.5° (dec.).

*Analysis.*—Calculated for $C_{19}H_{20}O_4N_2S$: C, 61.27; H, 5.41; O, 17.18; N, 7.52; S, 8.61. Found: C, 61.69; H, 5.45; O, 16.52; N, 7.61; S, 8.80.

EXAMPLE 2

An acute toxicity determination was made of the compound prepared in Example 1 in accordance with standard pharmacological test procedures and revealed in $LD_{50}$ in mice by intraperitoneal administration of 82 mg./kg. The intraperitoneal $LD_{50}$ of the comparison drug promazine is 122 mg./kg.

The antidepressant activity of the compound was determined by measuring its norepinephrine potentiating activity in comparison with the known antidepressant agent promazine. The activity of promazine is qualitatively similar to that of the known antidepressant agent imipramine which is believed to reside in its ability to potentiate or increase the availability of norepinephrine in the brain (E. B. Sigg, Canad. Psych, Ass. J. 4:575 (1959)). The same antidepressant agent imipramine has been shown to potentiate or increase norepinephrine activity in sympathetically innervated tissues, probably by blocking norepinephrine uptake (J. Axelrod et al., Science 133:383 (1961)).

The quantitative norepinephrine activity of the compound prepared in Example 1 was evaluated on isolated guinea pig atria according to the following procedure:

Guinea pigs were sacrificed and the heart was rapidly removed. The atria were dissected out and suspended in a jacketed organ bath maintained at 29° C. containing 20 ml. of McEwen's solution. The solution was aerated both in the bath and in the reservoir with a mixture of 95% $O_2$ and 5% $CO_2$.

Atrial contractions were measured by means of a strain gauge transducer. The output from the transducer was recorded on either an Offner Type 52 Dynograph Recorder or a Brush Mark 240 pen recorder. The contraction amplitude was measured from the chart paper in millimeters.

Contractions were recorded before the addition of the sympathomimetic drug to determine the resting amplitude of contraction and for two minutes after the addition of the drug, at which time recording was discontinued and the drug was washed out. The maximum amplitude of contraction achieved while the drug was in the bath was designated as the drug response. Between drug additions, a fixed washing procedure was adopted such that the spontaneous contractions were returned to their resting level.

In each test, a dose of sympathomimetic amine (norepinephrine) was selected so as to give a submaximal response, and this dose was given until five consistent responses were obtained. A dose of $1.1 \times 10^{-7}$ moles of the test drug, or promazine, standard was then injected into the bath after the completion of the normal washing sequence and left in contact with the atria for two minutes. The standard dose of amine (norepinephrine) was then added, and contractions recorded for a further two minutes. This procedure was repeated until five responses to the sympathomimetic amine in the presence of the test drug or promazine standard had been obtained. The normal washing procedure was adhered to throughout.

The mean control response was compared with the mean response obtained in the presence of the agonist compound. The statistical significance of the difference between the means was tested by means of the student's $t$ test. Thus a separate result was obtained for each test.

In the case of quantitative studies, responses were measured as the difference between "resting amplitude of contraction" and "response height." Response was plotted against a variable which was linearly related to log dose.

In each test, a norepinephrine dose-response curve was obtained. Three or four doses were selected from the linear portion of the curve and repeated so that either two or three responses were obtained at each dose level.

The dose-response curve was then repeated with doses of $1.1 \times 10^{-7}$ moles of the compound being tested preceding the doses of norepinephrine. Again, three doses were selected from the linear portion of the curve and either two or three responses were obtained at each dose level.

Regression lines were fitted to the points thus obtained by the method of least squares.

For ease of calculation of the regression equations, the responses to norepinephrine were plotted against a variable which was linearly related to the logarithm of the dose injected and also to the logarithm of the bath concentration, as the dilution factor remained constant. The regression equations thus obtained were checked statistically for linearity, parallelism and coincidence before proceeding with the calculation of potency ratios.

The horizontal distance between the lines with the 95% confidence limits was calculated. This represented the ratio of the potency of norepinephrine in the absence and in the presence of the compound.

Using a final bath concentration of $5.5 \times 10^{-6}$ M. for the compound tested and the promazine standard, the following results were obtained:

| Compound: | Norepinephrine potentiation (potency ratio) |
|---|---|
| Promazine | 8.2 |
| Compound from Example 1 | 2.4, 1.7 |

Thus the compound of this invention has marked ability to potentiate norepinephrine in this test.

Since a side effect attributable to established antidepressant agents relate to anti-cholinergic activity a determination was made in the quinea pig ileum measuring the anti-muscarinic activity of each of the compounds tested. The method used was as follows:

Anti-muscarinic activity was measured by the $pA_2$ method described by H. O. Schild British H. Pharmacol. 2:189 (1947). A strip of ileum 2.5–3.0 cms. in length was met up in a 12 ml. overflow jacketed organ bath maintained at 32° C. and supplied with a mixture of 95% $O_2$ and 5% $CO_2$ mixture. The tissue was bathed with Tyrode solution. Contractions were measured with an isotonic semiconductor strain gauge transducer. A static load of 1 gm. tension was placed on the tissue so as to reduce spontaneous contractions. The output of the transducer was fed via a balancing bridge to a Bausch and Lomb VOM 7 potentiometric recorder.

Acetylcholine (ACh) doses were added to the ileum every 3 mins. The bath was washed out after the maximal response was achieved. A constant response was obtained to a submaximal dose of acetylcholine ($1 \times 10^{-7}$ to $1 \times 10^{-8}$ gm./12 ml. bath). The antagonist drug was given 2 minutes before a double dose of ACh. Three doses of the antagonist drug were chosen such that the middle dose reduced the response to a double dose of ACh to roughly that of a single dose; and the higher and lower dose of antagonist reduced the response to a double dose of ACh to respectively less than and more than the single dose response. Doses of the antagonist were given a Latin square sequence. A constant response was obtained to a single dose of ACh between each dose of antagonist.

The results were summarized for each antagonist as a regression equation and the corresponding $pA_2$ value, where $pA_2=-\log (A)$; (A) being the molar antagonist concentration that will reduce the response of a double dose of ACh to that of a single dose in the absence of antagonist.

The test results reveal that the compound of Example 1, 5 - methyl - 4H - 5,6,7,8 - tetrahydro - 5,9 - diazocino[1,2,3-kl]phenothiazine, is $1/17$ as potent in anticholinergic properties as promazine. Since promazine is only 4 times more active than the compound of Example 1 in norepinephrine potentiation (thus, antidepressant activity), with 17 times the anticholinergic side effect, the compound of this invention is shown to possess a more favorable potential for safe antidepressant activity than the known antidepressant promazine.

The subject matter which the applicants regard as their invention is particularly pointed out and distinctly claimed as follows:

1. 5 - methyl - 4H-5,6,7,8-tetrahydro-5,9-diazocino[1,2,3-kl]phenothiazine.

References Cited

UNITED STATES PATENTS 2,919,271    1959    Craig et al. _____ 260—243

HENRY R. JILES, Primary Examiner

H. I. MOATZ, Assistant Examiner

U.S. Cl. X.R.

424—247